United States Patent
Koeberle

(10) Patent No.: US 7,320,717 B2
(45) Date of Patent: Jan. 22, 2008

(54) INDUSTRIAL SCALE HONEYCOMB TYPE DUST COLLECTOR

(75) Inventor: Paulo Goes Koeberle, Montreal (CA)

(73) Assignee: Biothermica Technologies, Inc., Montreal, Quebec (CA)

( * ) Notice: Subject to any disclaimer, the term of this patent is extended or adjusted under 35 U.S.C. 154(b) by 423 days.

(21) Appl. No.: 10/995,372

(22) Filed: Nov. 24, 2004

(65) Prior Publication Data
US 2006/0107627 A1     May 25, 2006

(51) Int. Cl.
*B01D 46/00*     (2006.01)
*B01D 46/04*     (2006.01)

(52) U.S. Cl. ............... 55/302; 55/303; 55/417; 55/419; 55/482; 55/484; 55/487; 55/495; 55/521; 55/523; 55/DIG. 30; 60/311; 96/11; 428/116

(58) Field of Classification Search ........... 55/302, 55/303, 417, 418, 419, 482, 483, 484, 486, 55/487, 490, 495, 521, 523, DIG. 30; 60/311; 96/4, 11; 428/116, 117, 118
See application file for complete search history.

(56) References Cited

U.S. PATENT DOCUMENTS

| | | | |
|---|---|---|---|
| 4,276,066 A | | 6/1981 | Bly et al. |
| 4,290,263 A | * | 9/1981 | Mann et al. ............ 55/419 |
| 4,343,631 A | * | 8/1982 | Ciliberti ............... 55/302 |
| 4,346,557 A | | 8/1982 | Shadman et al. |
| 4,416,676 A | * | 11/1983 | Montierth ............. 55/523 |
| 4,460,388 A | * | 7/1984 | Fukami et al. .......... 55/521 |
| 4,833,883 A | * | 5/1989 | Oda et al. ............. 55/523 |
| 5,078,760 A | * | 1/1992 | Haldipur et al. ........ 55/523 |
| 5,240,485 A | * | 8/1993 | Haerle et al. .......... 55/523 |
| 5,433,771 A | * | 7/1995 | Bachovchin et al. ..... 55/523 |
| 5,716,559 A | * | 2/1998 | Larsen et al. .......... 55/523 |

* cited by examiner

*Primary Examiner*—Jason M. Greene
(74) *Attorney, Agent, or Firm*—Arent Fox LLP

(57) ABSTRACT

A dust collecting filter such as a honeycomb-type industrial filter for the industrial filtering of gas containing solid particles is provided. The filter includes a plurality of collateral inlet and outlet channels separated by shared filtering boundaries. The inlet channels coalesce at both their extremities into opposite inlet plenums, and the outlet channels similarly coalesce into an outlet plenum at at least one of their extremities. The filter is easily cleanable by flow reversal without dead-end accumulation of particles in the inlet channels since they do not have any dead-end.

22 Claims, 13 Drawing Sheets

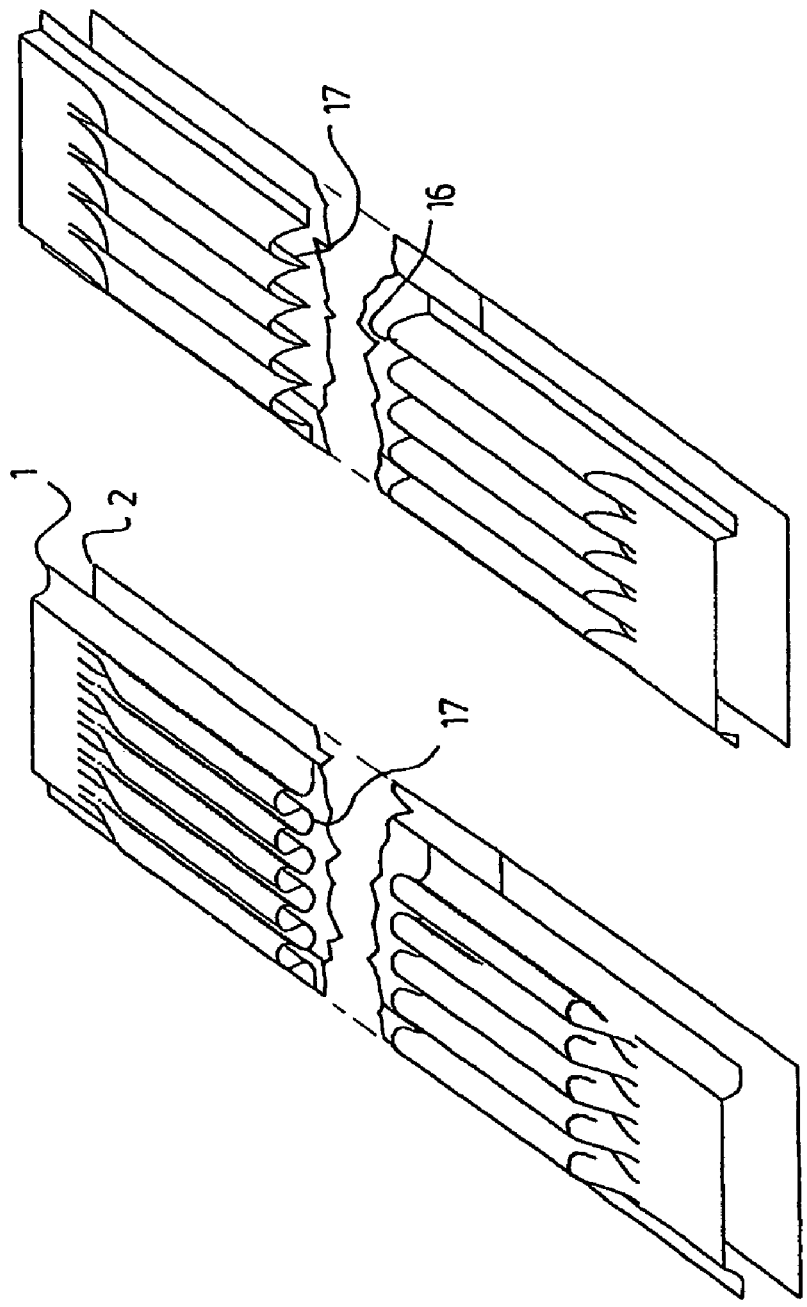

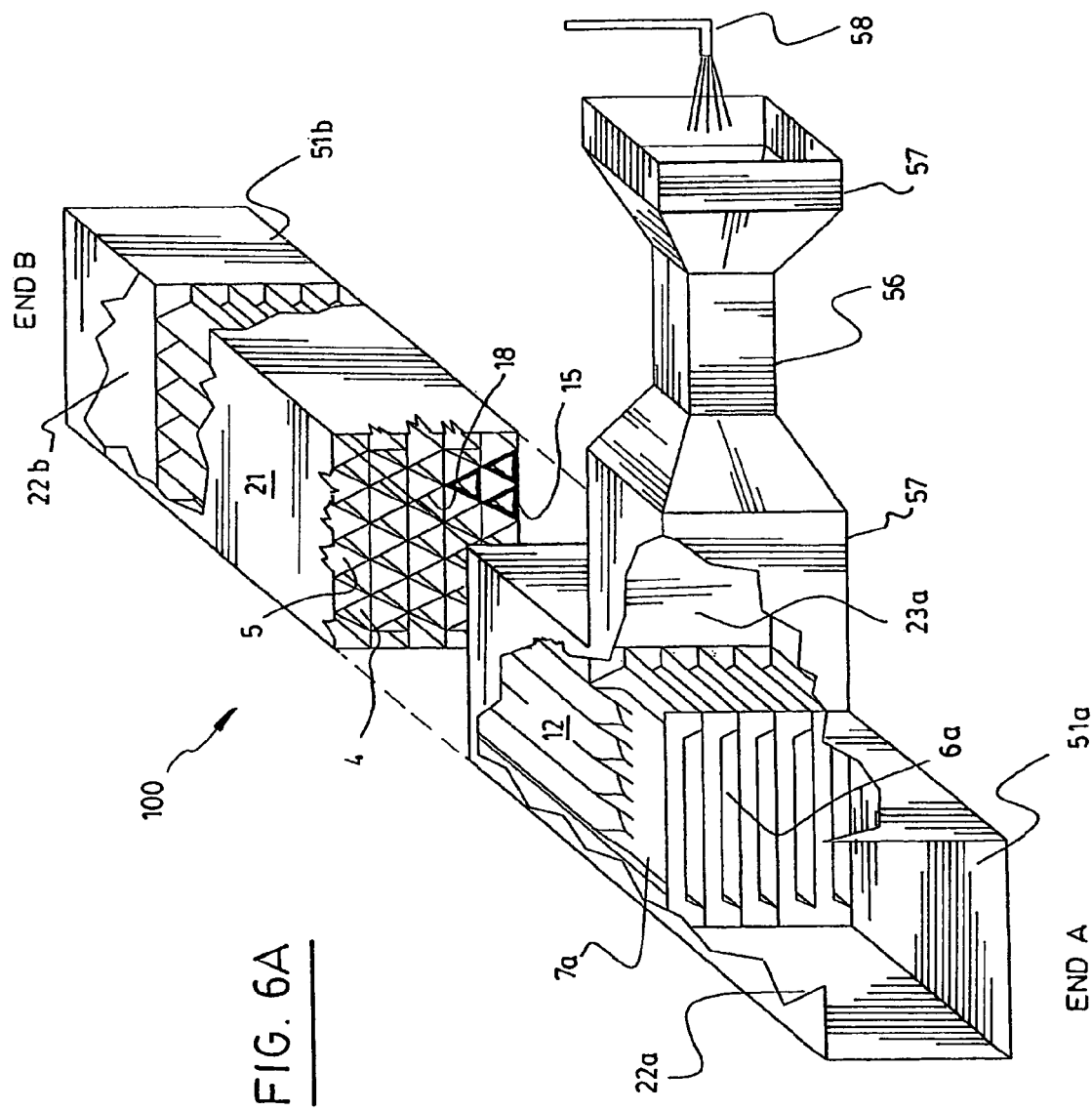

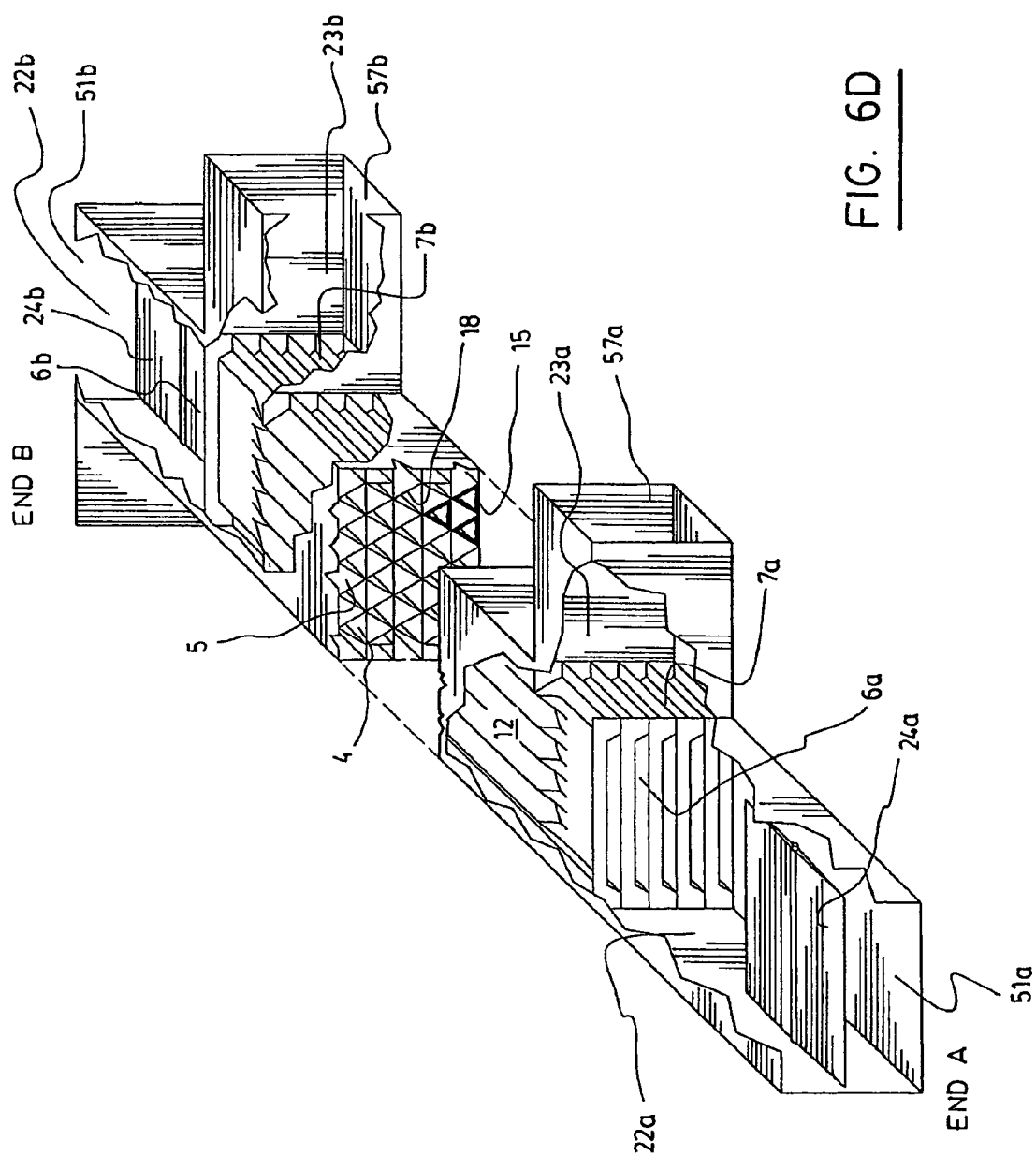

INDUSTRIAL SCALE HONEYCOMB TYPE DUST COLLECTOR

FIELD OF THE INVENTION

The present invention relates to the field of industrial filtering of gases, and more particularly concerns an improved cleanable dust collecting filter.

BACKGROUND OF THE INVENTION

Industrial filters, particularly honeycomb-type filters, are typically used for removing polluting particles from gases such as flue gas, engine exhausts, stacks, pneumatic transport and high temperature gases. Honeycomb filters are advantageously highly compact, structurally sound, self-supporting and lightweight. They are free of constraints of can velocity and they can be put close together in large arrays. Because of their compact size, they are generally washable, less prone to explosions from combustible dust and may generally operate in either horizontal or vertical position.

The traditional design of honeycomb filters comprises long parallel inlet and outlet channels open on alternate ends, arranged in either a checkerboard or a triangular pitch fashion and made of filter media. Gas flows from the inlet channels to the outlet channels, leaving an accumulation of solid particles along the filtering boundaries of the inlet channels which necessitates periodic cleaning of the filter.

The most common technique for cleaning filters is through flow reversal. Pressurized gas is projected backward in the filter, inversely to the gas flow of the normal filtering operation, dislodging the accumulated particles and pushing them out of the filter through its inlet.

Because of the great length of the channels and their small section, the axial velocities in the filter are very high compared to non-honeycomb filters. Because of the high tangential velocity in the channels during reverse flow cleaning, an important part of the cleaning is done tangentially by axial shear forces that preferably remove the surface of the filter cake.

The cake located deeper in the filter medium and hereby named as residual cake, is shielded from the high velocity gases that move along the channels. This residual cake will not be removed. When filtration re-starts, the residual cake acts as a filter medium and prevents particulate matter penetration through the filter as it happens in conventional filters due to over-cleaning.

A major problem in honeycomb filters is therefore solid particulate accumulation on and near the closed end of the inlet channels, which cannot be easily be removed through flow reversal. Referring to FIGS. 1A to 1D (PRIOR ART), the schematics of filtration inside a prior art honeycomb cleaned by flow reversal are illustrated, showing the problem of dead-end accumulation. FIG. 1A shows a typical filtration cycle: particle laden gases enter an inlet channel 4 through its open end 31, cross the filter media partition wall 18 into the contiguous outlet channel 5 and exit through the open end 32. The particles from the dirty gases are deposited as a filter cake 15 on the partition wall 18 inside the inlet channel 4.

FIG. 1B illustrates the cleaning schematics of conventional honeycombs. The reverse flow of gases enters the open end 32 and the outlet channel 5, crosses the partition wall of filter media 18 into the inlet channel 4 where it detaches and transports the filter cake 15 out through the open end 31. The low flow near the closed end 33 of the inlet channel 4 however is not strong enough to remove all of the cake 15, and some of it remains inside the inlet channel's dead-end 33.

FIG. 1C shows a second filtration cycle following the cleaning cycle of FIG. 1B. As can be seen, in the proximity of the dead-end 33, the new cake 15 is deposited over the leftover cake 15 from the earlier filtration cycle, creating an even thicker accumulation. This problem worsens over time, as may be seen on FIG. 1D, which shows the cake 15 accumulation on and near the dead-end 33 after a number of cleaning and filtration cycles.

Mechanisms other than flow reversal were thought of, including the in-place burning of the filtered particles in cases where it is combustible. In this respect, U.S. Pat. Nos. 4,276,066 (BLY et al.) and 4,346,557 (SHADMAN et al.) both disclose honeycomb filters for Diesel exhaust emissions composed mainly of soot particles, in which cleaning is accomplished by burning the soot, thereby eliminating the dead-end particle accumulation. It should be noted however that this approach works only if the filtered particles are combustible, ash-free and where the high temperatures developed during combustion can be tolerated.

In view of the above, there is therefore a need for an easily cleanable dust collecting filter which alleviates the above-mentioned drawbacks.

OBJECTS AND SUMMARY OF THE INVENTION

It is therefore an object of the present invention to provide a dust collecting filter avoiding the over accumulation of dust particles in the inlet channels.

It is a preferential object of the invention to provide such a filter with means for easily cleaning these inlet channels through flow reversal.

It is another preferential object of the invention to further provide means for sequentially cleaning each extremity of the inlet channels.

Accordingly, the present invention provides a dust collecting filter for the filtering of gas containing solid particles, which includes a first and a second inlet plenum for receiving this gas containing solid particles. A plurality of collateral inlet channels are provided, each having opposite first and second input extremities respectively connected to the first and second inlet plenums, to receive the gas therefrom. A plurality of outlet channels is also provided. Each outlet channel has a shared filtering boundary with at least one of the inlet channels, the filtering boundaries allowing gas to flow from the inlet channels to corresponding outlet channels while substantially retaining the solid particles from the gas in the inlet channels. Each of the outlet channels has a first output extremity, and the dust collecting filter is provided with a first outlet plenum connected to the first output extremity of all of the outlet channels for outputting the gas therefrom.

As will be appreciated, the present invention solves the problem of dead-end particulate accumulation by eliminating dead-ends in the inlet channels or alternatively, on both inlet and outlet channels. In the preferred embodiment, dead-ends are eliminated by coalescing the channels ends into plenums, and further connecting them to ducts. Means are provided to direct the discharge of solids sequentially through either ends of the inlet channels during cleaning by flow reversal, thereby ensuring removal of solid particles from both extremities of the inlet channels.

Other features and advantages of the present invention will be better understood upon reading of preferred embodiments thereof with reference to the appended drawings.

BRIEF SUMMARY OF THE DRAWINGS

FIGS. 2A, 2B and 2C respectively show the filtering cycle, first cleaning step and second cleaning step in a filter according to an embodiment of the invention. FIGS. 2D and 2E illustrate the one-step cleaning of filters according to two other embodiments of the invention.

FIGS. 5A and 5B are exploded perspective views of filter plates according to alternative embodiments.

FIGS. 6A to 6E are perspective partially cross-sectional views of dust collecting filters according to various embodiments of the invention.

DESCRIPTION OF PREFERRED EMBODIMENTS OF THE INVENTION

Figure 1A:
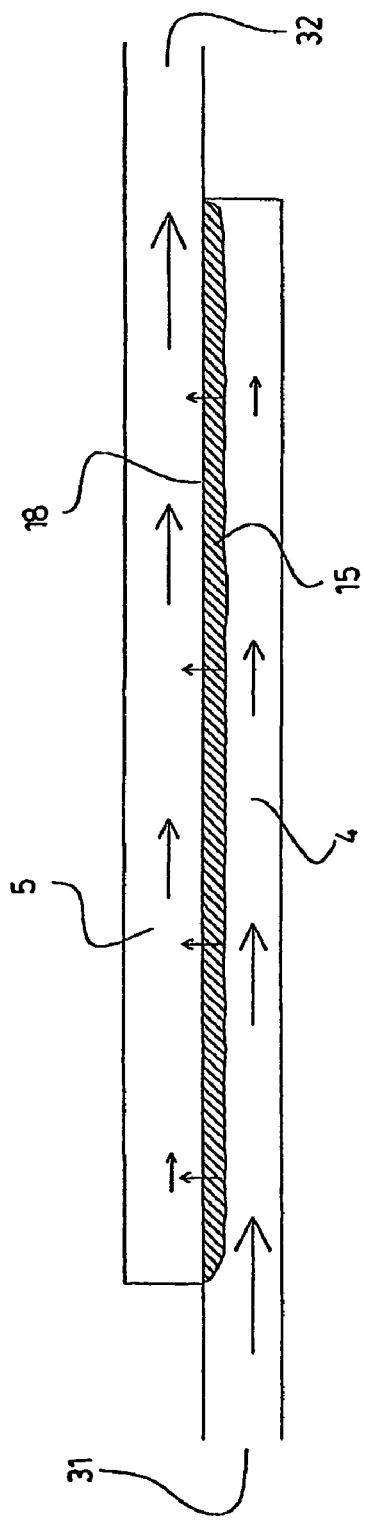
FIGS. 1A to 1D (PRIOR ART) schematically illustrate the dead-end accumulation of solid particles in prior art filters.
Figure 1B:
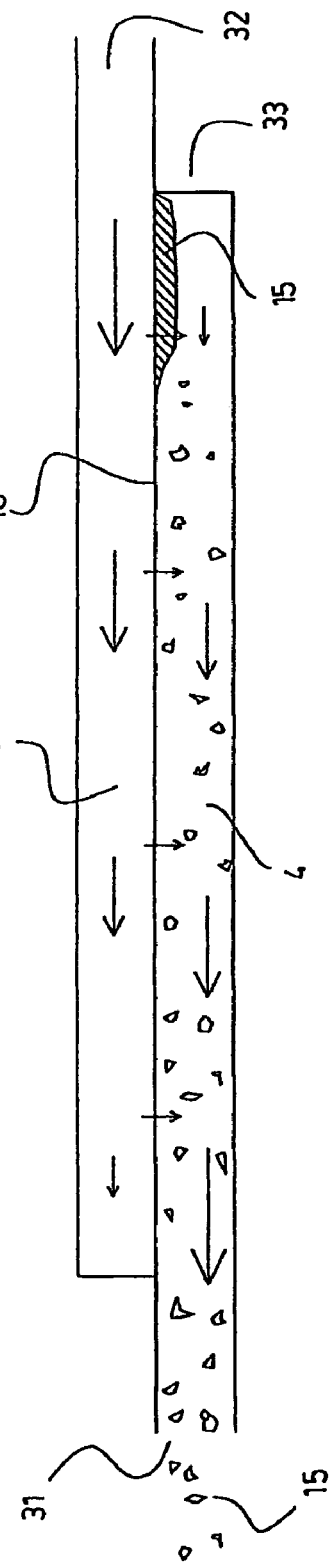
Figure 1C:
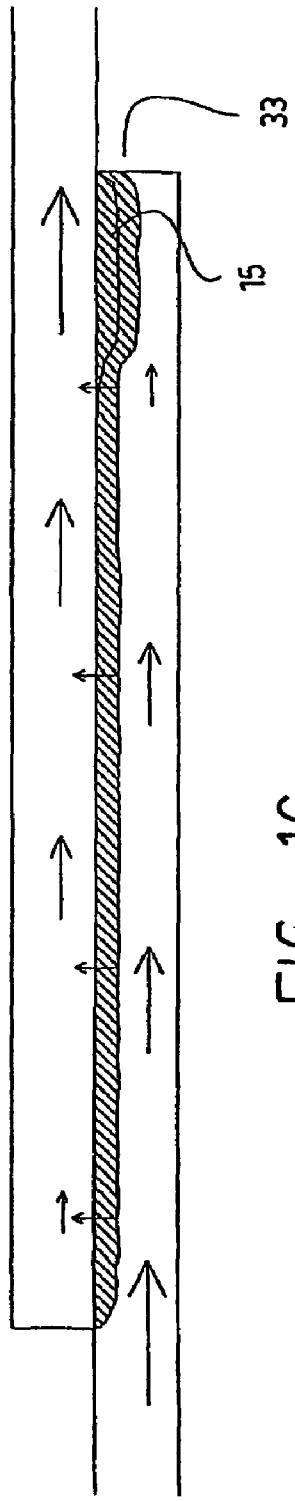
Figure 1D:
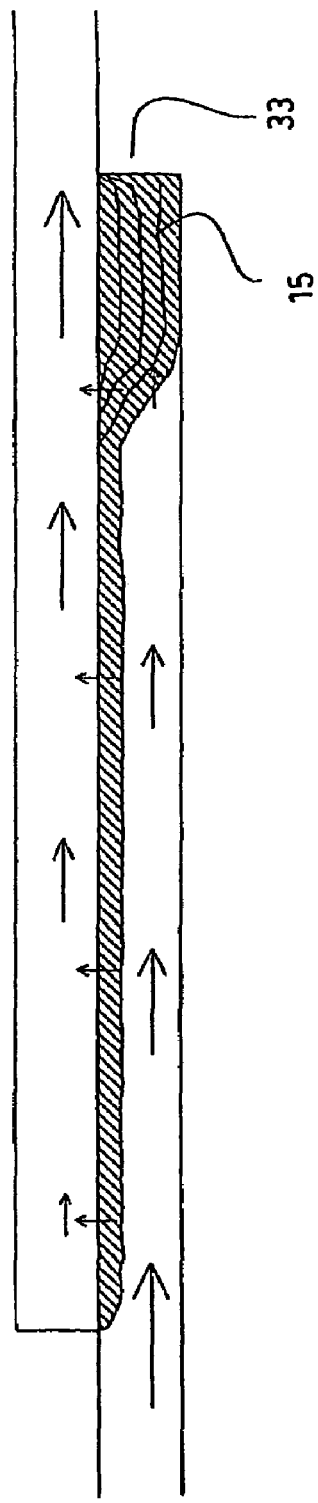

The present invention provides a dust collecting filter in which dead-end accumulation is solved by eliminating dead-ends in the inlet channels.

Referring to FIG. 6A, the components of a filter 100 according to a first preferred embodiment of the invention will be described. The filter 100 includes a plurality of collateral inlet channels 4, preferably extending parallel to each other, each having opened opposite first and second extremities. The extremities of all of the inlet channels are connected to first and second inlet plenums 22a and 22b disposed on corresponding sides of the structure defined by the inlet channels 4. The inlet channels may simply be opened on one extremity which leads directly to one of the inlet plenums, such as for example seen at end B of the filter of FIG. 6A. As an alternative, coalesced channel 6a, such as shown at end A of the device of FIG. 6A, may be used to bridge the gap between at least one of the extremities of the inlet channels 4 and the corresponding inlet plenum 22a or 22b.

A plurality of outlet channels 5 are also provided, each having a shared filtering boundary with at least one of the inlet channels 4. In the illustrated embodiments, the inlet and outlet channels extend along each other to form a honeycomb-type structure made of alternating inlet 4 and outlet 5 channels. The filtering boundaries are understood to be of any type allowing gas to flow from the inlet channels 4 to corresponding outlet channels 5, while substantially retaining the solid particles from this gas in the inlet channels 4.

Each of the outlet channels 5 has opposite first and second output extremities at ends A and B, at least one of which is open. In the illustrated embodiment of FIG. 6A, only the first extremity is open. A first outlet plenum 23a is operatively connected to the first output extremity of all of the outlet channels 5 for outputting the cleaned gas therefrom. Still referring to the embodiment of FIG. 6A, outlet channels 5 of a given row in the honeycomb coalesce at their first extremity into plate outlets 7a, which in turn coalesce into the outlet plenum 23a.

Figure 6B:
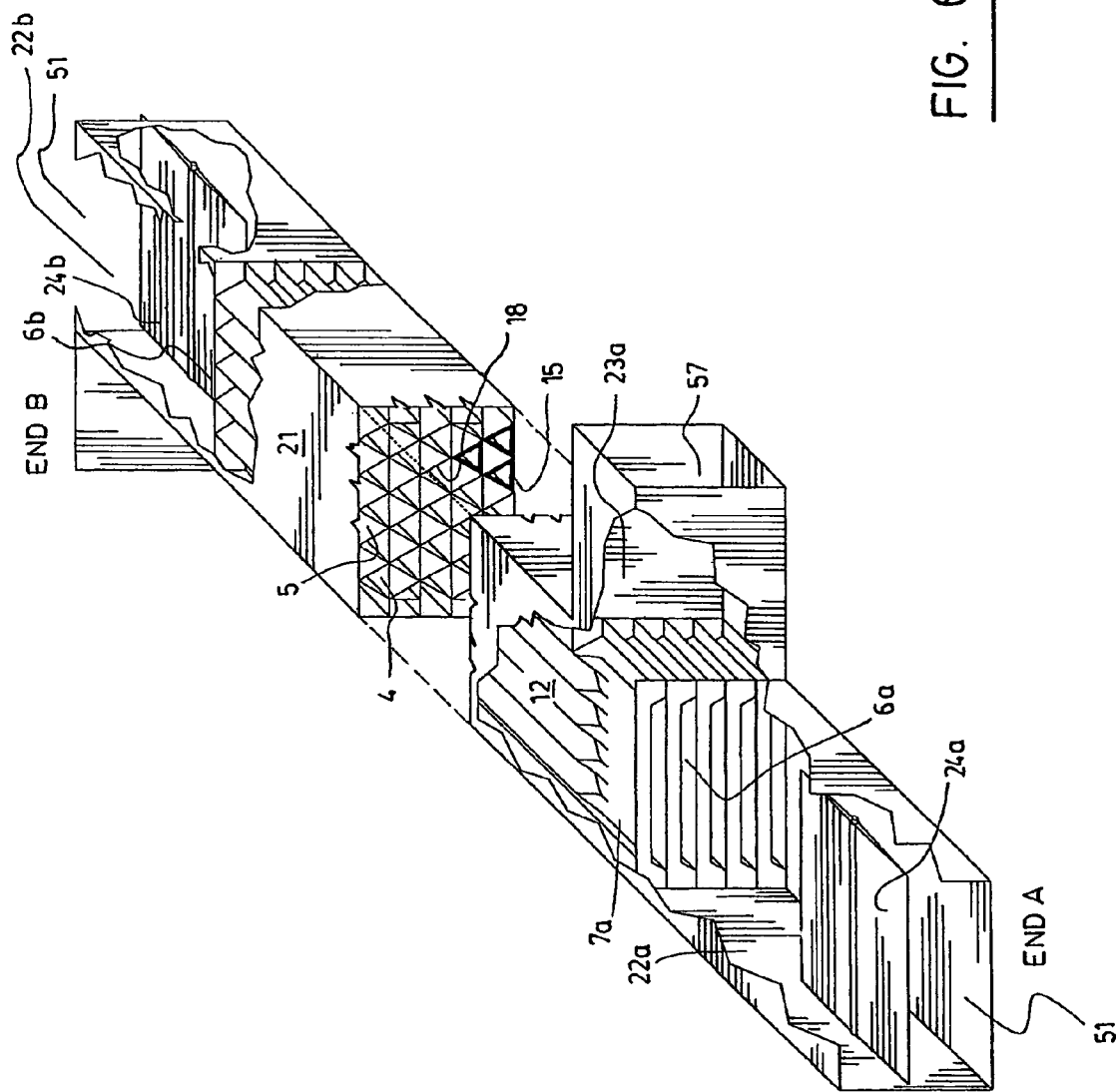
Figure 6C:
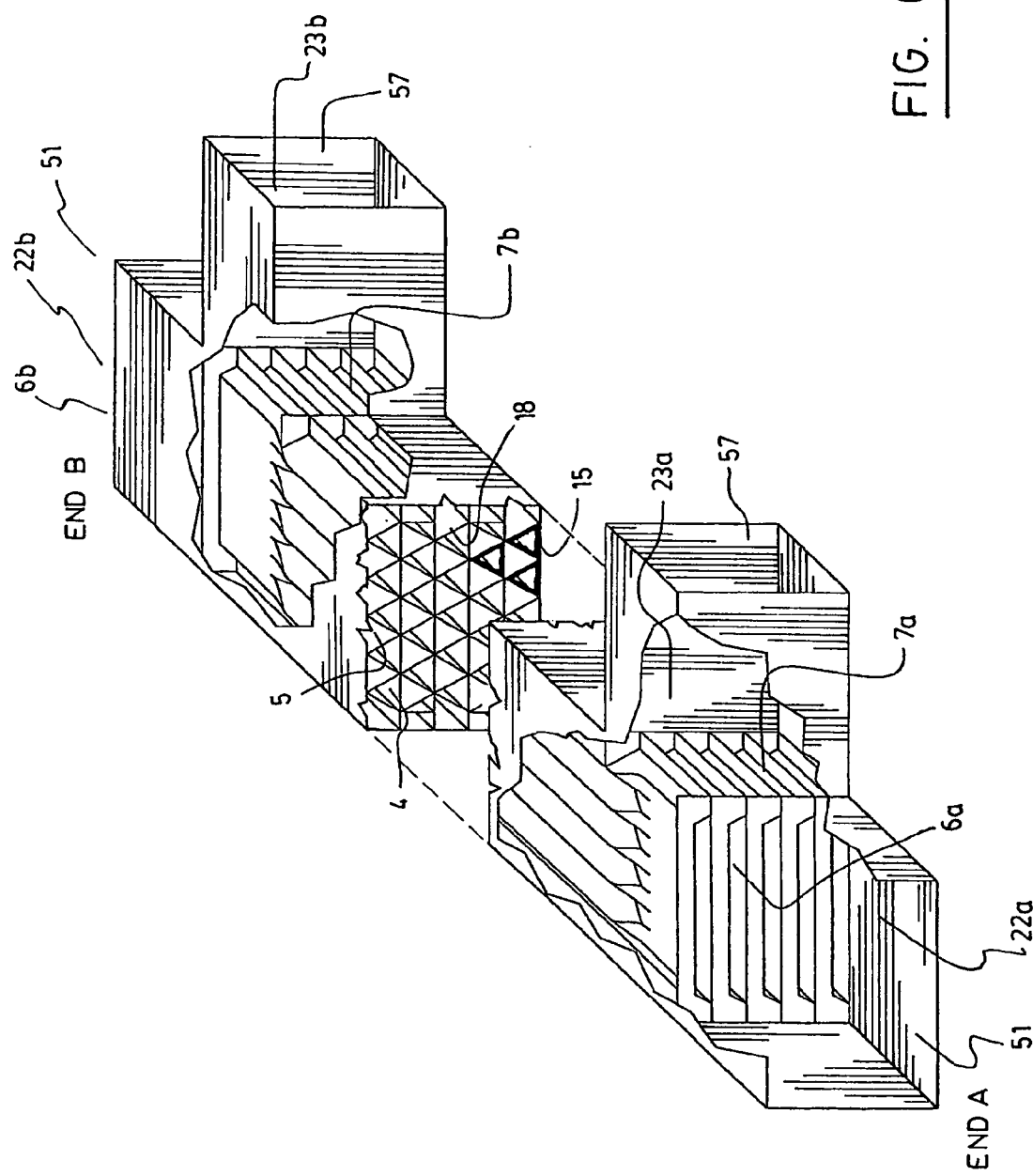

In an alternative embodiment, such as the one of FIG. 6C, the second extremity of the outlet channels 5 is also open, and a second outlet plenum 23b is connected thereto to receive the filtered gas therefrom. Preferably, similarly to the first extremity, outlet channels 5 of a given row in the honeycomb coalesce at their second extremity into plate outlets 7b, which in turn coalesce into the second outlet plenum 23b.

Figure 3:
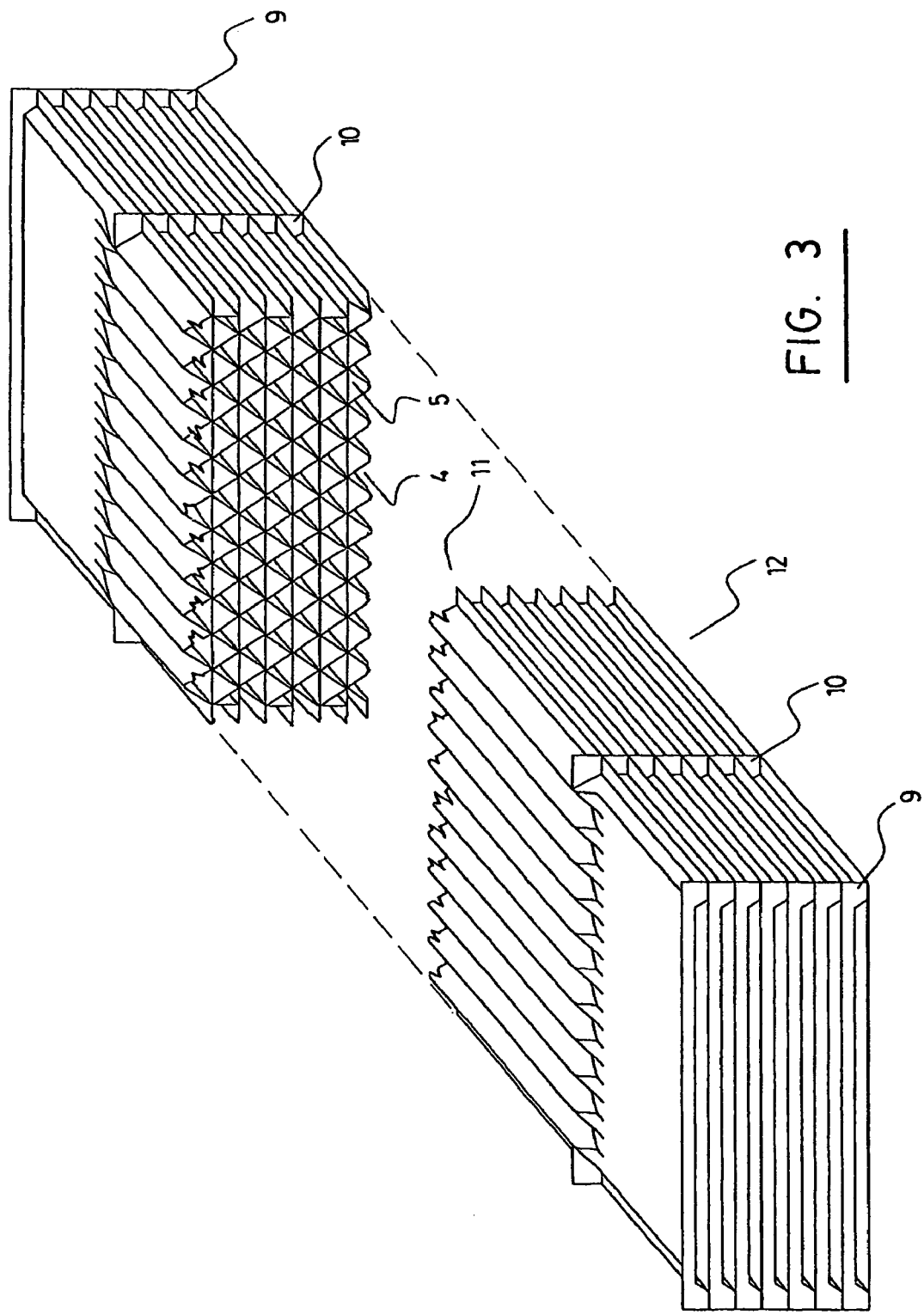
FIG. 3 is a perspective view of a stack of filter plates forming a honeycomb according to one aspect of the invention.
Figures 4A, 4B:
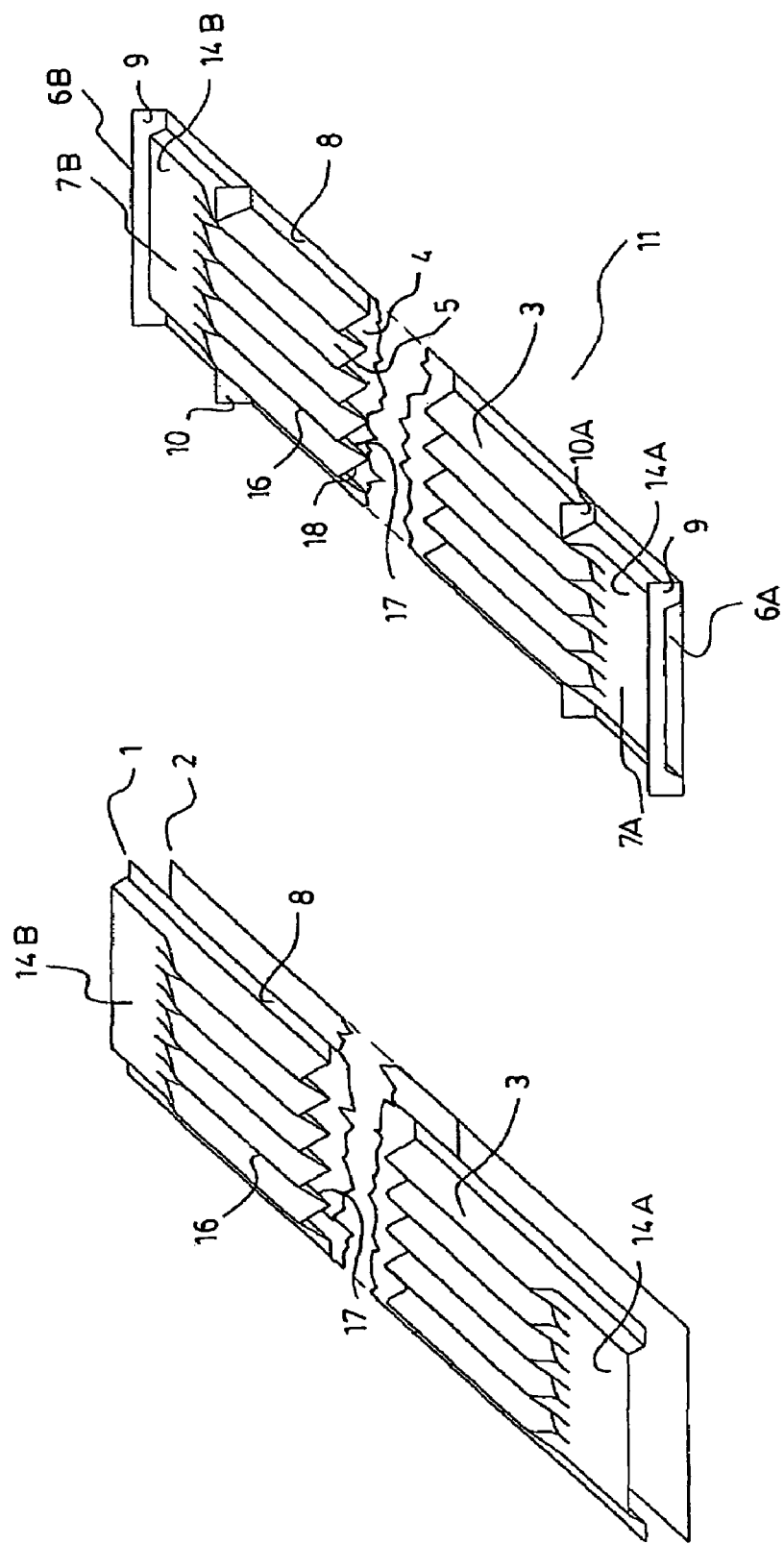
FIG. 4A is an exploded perspective view of a filter plate according to a preferred embodiment of the invention.
FIG. 4B is an assembled view of the filter plate of FIG. 4A.

Referring to FIGS. 3, 4A and 4B, the construction of filters according to preferred embodiments of the present invention will be described.

FIG. 3 shows a preferred embodiment of a honeycomb filter including a plurality of identical filter plates 11, stacked one on top of the other forming a honeycomb filtering structure 12. The figure shows the section of the preferred honeycomb where inlet channels 4 alternate with outlet channels 5 in a triangular pitch distribution.

FIGS. 4A and 4B illustrate the construction of a typical filter plate 11. Shown in exploded view of FIG. 4A are a wavelike shaped filtering sheet 1 and a flat sheet 2, preferably of self-supporting filter media, which together form a filter plate 11. The wavelike sheet 1 has folds 3 throughout most of its length, defining crests 16 and valleys 17 which form a set of grooves on each side of the sheet. These alternating grooves form the basic structure for the inlet channels 4 on one side of the sheet 1, and the outlet channels 5 on the other.

Preferably, near at least one end of the wavelike sheet 1, the folds 3 are flattened out in a way that flat surfaces 14a, 14b created in this manner lie in a plane that is parallel and in between the two planes determined by the pleat crests 16 and pleat valleys 17, respectively. The wavelike sheet 1 also preferably has a longitudinal border on both sides 8 where it joins the flat sheet 2.

FIG. 4B shows the assembled view of a complete filter plate 11, obtained by joining a wavelike sheet 1 and a flat sheet 2. In the illustrated embodiment, the flat sheet 2 closes off the grooves on the bottom side of the wavelike sheet, therefore forming the inlet channels 4. Furthermore, the flat sheet of the filter plate stacked immediately above (not shown) will close off the grooves on the top side of the wavelike sheet 1, and therefore define therewith the outlet channels 5. In this manner, the wavelike sheet 1 and flat sheet 2 act as the filtering boundaries on each side of adjacent inlet and outlet channels.

The flat portions 14a, 14b of the wavelike sheet 1 form with the flat sheet 2 single flat channels one on each end which define the plate inlet coalesced channels 6a and 6b. Furthermore, the flat portions 14a, 14b of the wavelike sheet 1 form with the flat sheet 2 of the next filter plate stacked above (not shown) two single flat channels which define the plate outlet coalesced channels 7a, 7b. Also shown are provisions to deflect the gas flow on the plate outlet coalesced channels 7a, 7b by 90 degrees in the form of winglets 9a, 9b, 10a, 10b.

In alternating embodiments, the folding of the wavelike sheet 1 may have a profile different than the one discussed above. Referring to FIGS. 5A and 5B, different such possibilities are illustrated. FIG. 5A shows a wavelike sheet 1 where the folding is a corrugation or undulation and inlet channels 4 and outlet channels 5 have a lobed shape, and valleys 17 and crests 16 are rounded. FIG. 5B shows a folding that is concave on the inlet side and convex on the outlet side. Inlet channels 4 are convex and have a bigger section than outlet channels 5. Crests 16 are rounded and valleys 17 are sharp.

Each configuration of the folds in the wavelike sheet will have its own advantages and compromises. For instance, arched and corrugated fold sections will give a more elastic, springy and dimensionally tolerant structure than triangular section folds which favor a more rigid and dimensionally stable structure. Arched sections for inlet channels and corresponding shrunken sections for the outlet channels will provide extra space for cake accumulation thus reducing the need for frequent cleaning.

It will be readily understood with regards to the description above that while the sheets 1 and 2 of the filtering plates 11 may be made entirely of filter media, certain parts may be rendered on purpose impervious to gases or made of a non filtering material. Preferably, these parts include the flattened surfaces 14 on each end of the folded plate and the corresponding region in the flat sheets, vis-à-vis the flattened surfaces 14. The reason for this strategy is to avoid cake formation at the entrance of the filter plates 11 and a consequent increase in the overall head loss of the filter. The flats 8 along all the sheets and their corresponding region on the flat sheets are generally used to join tightly one wavelike sheet 1 and one flat sheet 2 to make a filtering plate 11; these regions therefore do not filter.

The self-supporting filter medium used to embody the sheets 1 and 2 may be of any appropriate materials and construction. Examples include bare wire mesh having openings in the range of 5 to 80 microns, any wire mesh laminated with a porous flexible membrane such as expanded poly-tetra-fluoro-ethylene, any wire mesh that can be coated with a membrane material, such as ceramic fiber paper or a synthetic fiber rigidized mat or paper.

Referring back to FIG. 6A, the operation of the filter 100 according to the first preferred embodiment of the present invention will be explained.

An inlet gas duct (not shown) is preferably connected through its branches 51a, 51b to the inlet plenums 22a and 22b. In this embodiment, the first inlet plenum 22a is connected to the inlet channels 4 on end A via plate coalesced inlet channels 6a, and the second inlet plenum 22b connects to the inlet channels 4 on end B directly. Alternated in between the inlet channels 4 are the outlet channels 5 which connect to the plate outlet coalesced channels 7a on end A of the honeycomb. The plate outlet coalesced channels 7a coalesce further into the outlet plenum 23a. The outlet plenum 23a is connected to an outgoing filtered gas duct 57.

According to an advantageous aspect of the preferred embodiments of the invention, cleaning means are preferably provided for cleaning the inlet channels 4 through reverse gas flow. In the illustrated embodiment of FIG. 6, the filtered gas duct 57 has a provision to reverse the flow, preferably a high pressure nozzle 58 oriented backwards to the filtration flow and a venturi 56 which serves as a flow amplifier. Preferably, the inlet gas duct has provisions (not shown) to capture solids during reverse flow cleaning.

The filter 100 operates in the following way: during the filtration cycle, a flow of inlet gases laden with particulate matter is allowed through the two inlet plenums 22a, 22b and enters the inlet channels 4 from both ends, passing the plate inlet coalesced channels 6a, on end A and via direct connection on end B. From there, the gases pass across the porous walls of the filtering boundaries 18 into the outlet channels 5, leaving behind, on the wall of the inlet channels 4, the solid particles in the form of a filter cake 15. The filtered gases in the outlet channels 5 flow to the only open end of the channels, pass the plate coalesced outlet channels 7a and then the outlet plenum 23a, and leave the filter through venturi 56 and duct 57.

The cleaning cycle involves a simple gas flow inversion. The reverse flow is induced by the high pressure jet 58, amplified by the venturi 56, and enters the single outlet plenum 23a into the honeycomb 12 via the plate outlet coalesced channels 7a. It then enters all outlet channels 5, passes through the filtering boundaries 18 and the filter cake 15 into the inlet channels 4, detaching this filter cake 15 and transporting it along the inlet channels 4 towards both filter ends A, B, then through the plate inlet coalesced channels 6a into plenum 22a on end A and directly into plenum 22b on end B, and finally out the filter into the income duct (not shown) via ducts 51a and 51b.

Figure 2B:
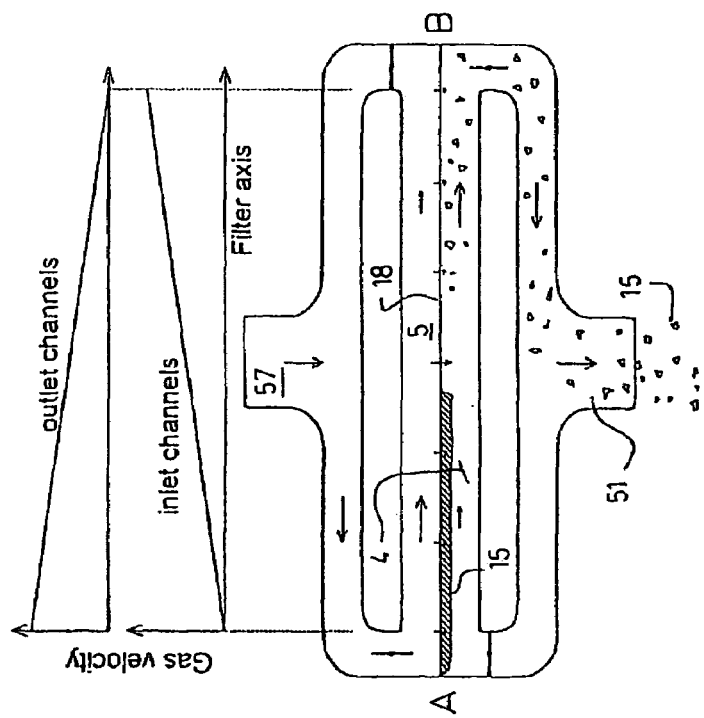
FIGS. 2A to 2E schematically illustrate the gas flow in filters according to preferred embodiment of the invention.
Figure 2A:
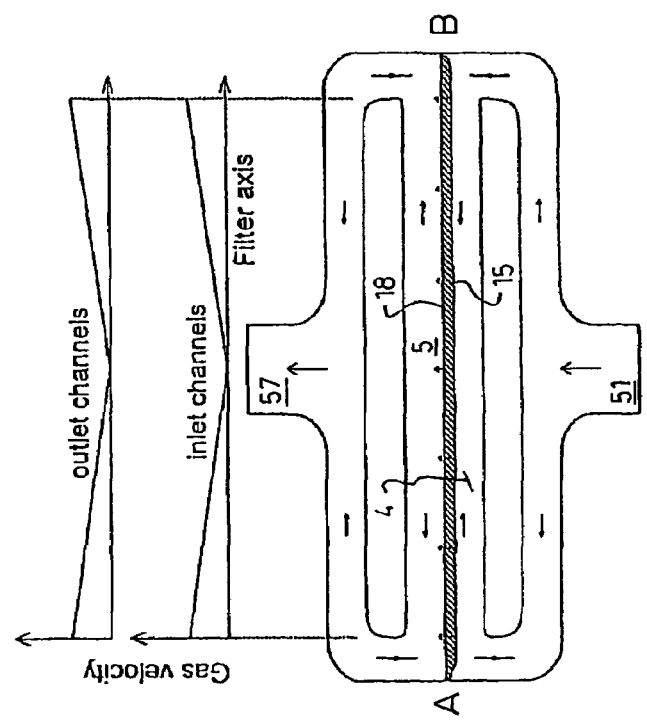
Figure 2D:
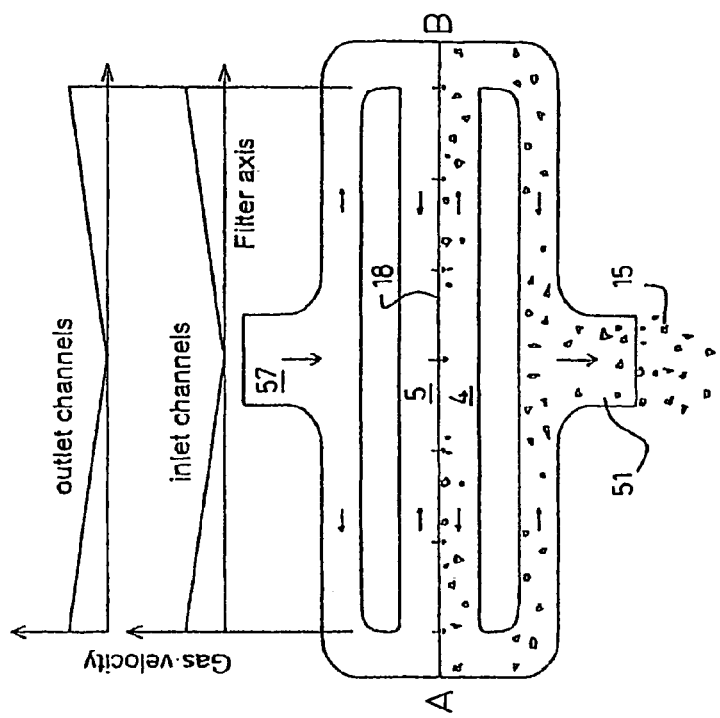
Figure 2C:
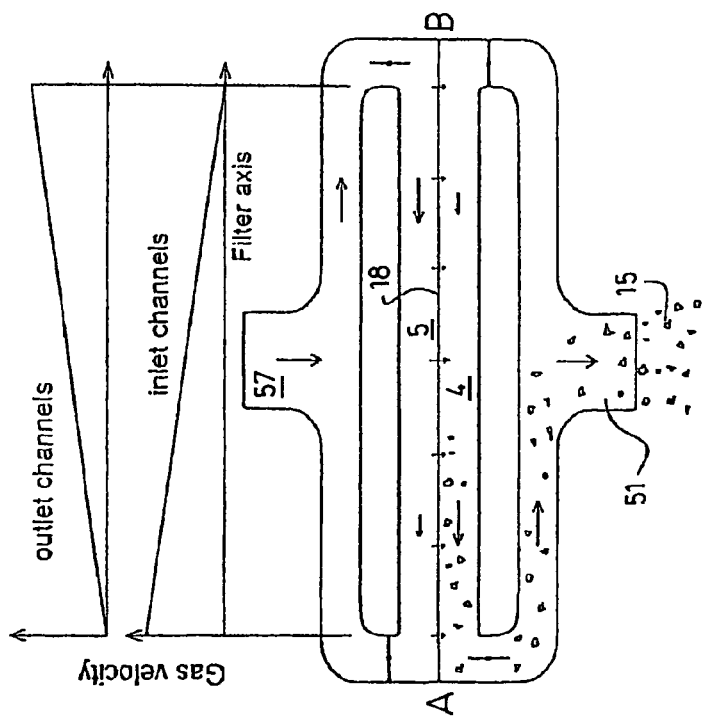
Figure 2E:
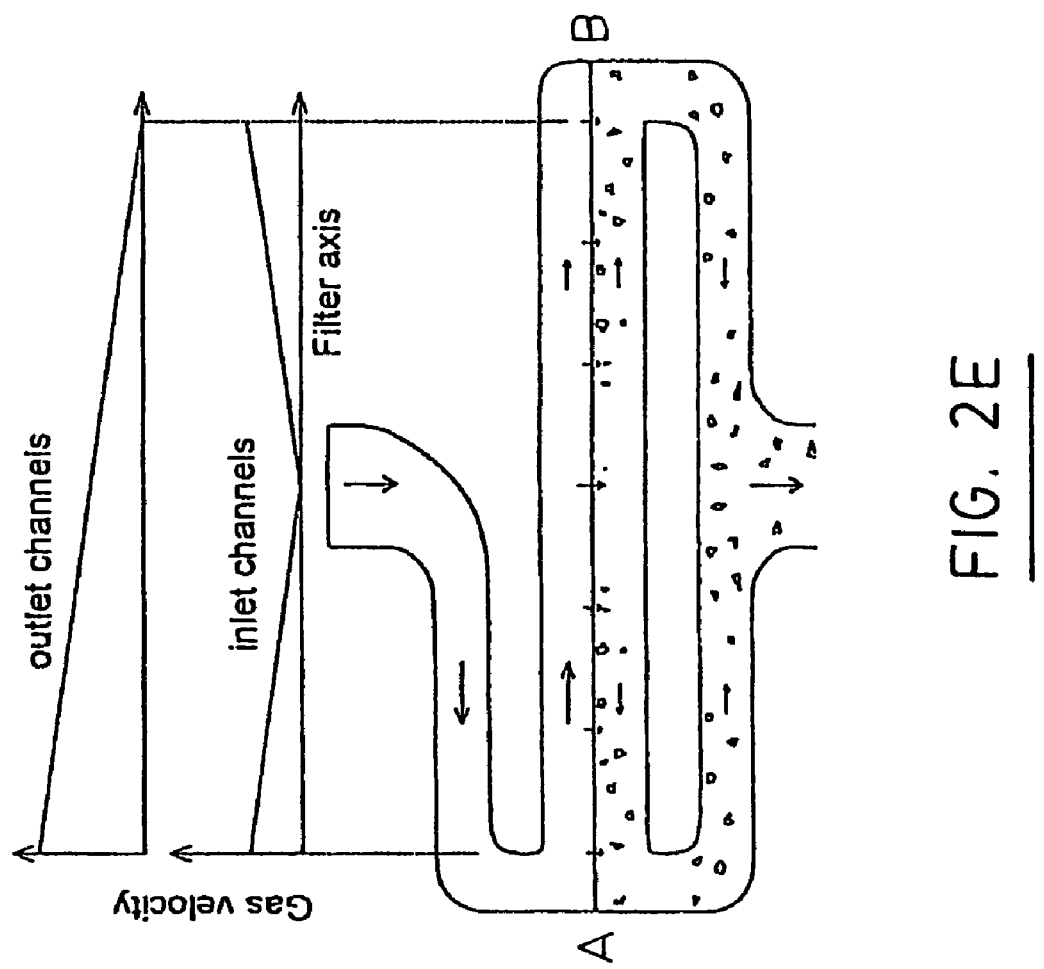

FIG. 2e schematically illustrates the gas flow in the honeycomb of the embodiment of FIG. 6a. Since there is not supposed to exist cake in the outlet channels, they may be closed on one end as shown. The reverse flow from outlet duct 57 enters the outlet channels 5 from one end only, passes through the filtering boundaries 18, detaches the cake 15 and carries it along the inlet channels 4 towards both ends and out the filter.

Referring to FIG. 6B, there is shown a second preferred embodiment of the present invention. The filter of the embodiment differs from the one of FIG. 6A in that the inlet plenum 22a is connected to the inlet channels 4 on end A via a first flow control inlet valve 24a, and the inlet plenum 22b connects to inlet channels 4 on end B via a second flow control inlet valve 24b.

The filtering operation of this filter is the same as described with reference to the embodiment above. The inlet valves 24a and 24b remain open during operation to allow gas flow from the inlet plenums 22a and 22b to the corresponding extremities of the inlet channels 4.

The cleaning cycle may be accomplished in one step which again involves a simple gas flow inversion. In this case, the flow control inlet valves 24a, 24b remain open, as during filtration. The induced reverse flow enters the honeycomb 12 through single outlet plenum 23a, then passes the plate outlet coalesced channels 7a, entering all outlet channels 5 from the end A, then passes through the filtering boundaries 18 and the filter cake 15 into the inlet channels 4, detaching the filter cake and transporting it along the inlet channels towards both filter ends A, B, then through both inlet plenums 22a, 22b, and the open valves 24a, 24b out the filter and into the income duct 51. The income duct 51 preferably has provisions such as a settling chamber or an inertial device (not shown) to separate the cake from the gas.

Still referring to the embodiment of FIG. 6B, a more elaborated filter cleaning may be performed in two consecutive steps, Step 1 and Step 2. In Step 1, the first inlet valve 24a is open and the second inlet valve 24b is closed. A strong reverse flow causes clean gas to flow backwards, enter outlet plenum 23a and into the honeycomb of the present embodiment, passing the plate outlet coalesced channels 7a and then entering the outlet channels 5. The gas flow again crosses the filtering boundaries 18 into the inlet channels 4 where they detach the filter cake 15. As only the first inlet valve 24a is open, the detached solid particles are carried towards end A where they pass the plate inlet coalesced channels 6a and then exit the filter through the first inlet plenum 22a. It can be appreciated that the gas velocity that carries the cake inside the inlet channels 4 is higher near the end A of the filter, thus better cleaning that end. In order to clean end B of the filter as well, a second step, Step 2 is required.

In Step 2, the second inlet valve 24b is in turn open and the first inlet valve 24a is now closed. As in the first step, the strong reverse flow causes clean gas to flow backwards, enter the honeycomb through the outlet plenum 23a, pass through the plate outlet coalesced channels 7a and into the outlet channels 5 and then crosses the filtering boundaries 18 into the inlet channels 4 where the gases detach the filter cake 15. This time, the detached particles are carried towards end B and then out the filter through the second inlet plenum 22b and open valve 24b, thus leaving the filter. It can be appreciated that the gas velocity that carries the cake is higher near the end B of the filter, thus better cleaning that end.

Referring to FIG. 6C, there is shown a third embodiment of the invention which mainly differs from the one of FIG. 6A in that there is a second outlet plenum 23b connected to the second extremities of the outlet channels 5, which are now opened on both ends. In this embodiment, both extremities of the inlet channels 4 are connected to the inlet plenums 22a and 22b through opposed plate inlet coalesced channels 6a and 6b, respectively. There are no flow control provisions in any of the plenums.

In this embodiment, during the filtration cycle, gas loaded with fine particles come from a inlet gas duct 51, and enter both inlet plenums 22a, 22b and through the plate inlet coalesced channels 6a, 6b into the inlet channels 4. In the inlet channels 4, while flowing in the direction to the center of the honeycomb 12, the gas crosses the filtering boundaries 18 between inlet channels and outlet channels while leaving the particles on the walls of the inlet channels 4, in the form of the filter cake 15. Inside the outlet channels 5, the gas flows towards both extremities A, B and from there to the plate coalesced outlet channels 7a, 7b and outlet gas plenums 23a, 23b and to the outlet gas duct 57.

Since it has no internal means of flow control, the filter of this embodiment can only perform a one-step cleaning. This cleaning cycle is therefore accomplished by simply inverting the gas flow. In this way, the inverted flow induced in the outlet duct 57 will return through both outlet plenums 23a, 23b into the outlet channels 5, cross the filtering boundaries 18 into the inlet channels 4, loosening the solid particulate cake 15 and transporting it through the inlet channels 4 to both filter extremities A, B and leaving the honeycomb filter through both inlet plenums 22a, 22b, to the inlet gas duct 51. The highly concentrated particles are there prone to settle out and are preferably caught by an inline hopper or a cyclone (not shown).

FIG. 2d shows the schematics of the one-step cleaning cycle of the embodiment described above, that is when all channels coalesce into plenums on both ends and no plenum is provided with means of flow control. The arrows in the drawings illustrate the reverse flow gases from outlet duct 57, which split in two and enter the outlet channels 5 from both ends, crosses the filtering boundaries 18 into the inlet channels 4 where they detach the cake 15 and transport it out through both ends into the inlet duct 51. As in the filtration cycle, no flow control is needed, making for a simpler system if the one-step cleaning is good enough. However, it should be noted from the graph above that figure that the axial gas velocity is relatively low.

FIG. 6D shows a fourth preferred embodiment similar to the one of FIG. 6C, where the inlet plenums 22a and 22b have flow control provisions in the form of a first and a second inlet valves 24a and 24b. The outlet plenums 23a, 23b have no flow control means.

During the filtration cycle, the two inlet valves 24a and 24b remain open as shown in the drawing of FIG. 6D. The gas flow during this cycle is therefore the same as for the preceding embodiment. The cleaning cycle however may here be performed in two steps, Step 1 and Step 2.

In Step 1, the first inlet valve 24a is open and the second inlet valve 24b is closed. As before, a strong reverse flow causes clean gas to flow backwards, enter outlet plenums 23a and 23b into the honeycomb, then pass the plate outlet coalesced channels 7a and 7b and enter the outlet channels 5 from both ends. The air flow then crosses the filtering boundaries 18 into the inlet channels 4 where it detaches the filter cake 15. In this step, the dust particles are carried along towards the only open end A of the inlet channels, passing the plate inlet coalesced channels 6a and then through the plenum 22a and open valve 24a thus leaving the filter. It can be appreciated that the gas velocity that carries the cake inside the inlet channels 4 is higher near the end A of the filter, thus better cleaning that end. In order to clean well the end B of the filter, a second step, Step 2 is required. In Step 2, the same operations are carried out with the second inlet valve 24b open and the first inlet valve 24a closed. It can be appreciated that the gas velocity that carries the cake 15 is then higher near the end B of the filter, thus better cleaning that end and completing the cleaning.

Figure 6E:
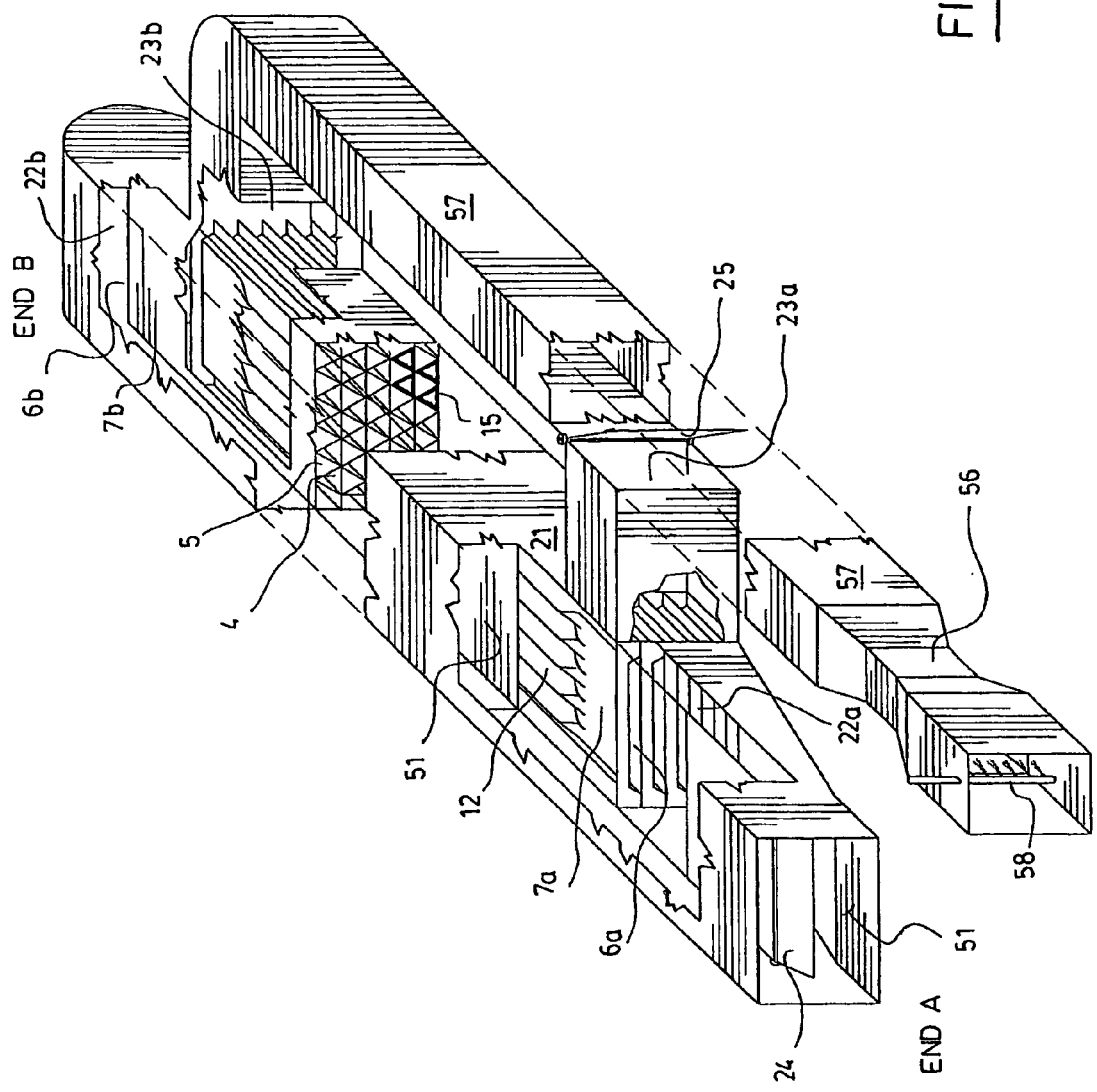

Yet another embodiment of the invention is illustrated in FIG. 6E. In this embodiment, the honeycomb filter has a structure similar to the one of the embodiment of FIG. 6C, with two inlet plenums 22a and 22b and two outlet plenums 23a and 23b. The inlet gas duct 51 is connected to an inlet 3-way valve 24 which connects it to the first inlet plenum 22a directly and to the second inlet plenum 22b via duct 51b. The two outlet plenums 23a and 23b are connected to the outgoing filtered gas duct 57 via an outlet 3-way valve 25 which can open either outlet plenum individually or both outlet plenums simultaneously.

The filtration cycle is carried out normally, with both inlet and outlet 3-way valves 24 and 25 open to allow gas flow through all inlet and outlet plenums. Cleaning is best carried out in a two-step process. Preferably, in step 1 the inlet 3-way valve 24 is operated to connect the inlet gas duct 51 with the first inlet plenum 22a only, thereby closing off the second inlet plenum 22b. The outlet 3-way valve 25 is inversely operated to connect the outlet gas duct 57 to the second outlet plenum 23b only. The filter is then cleaned by reverse flow. It will be appreciated that the axial velocity inside the honeycomb during the first cleaning step is highest in the inlet channels on the side of end A of the honeycomb filter and lowest on the side of end B. Therefore, while end A will be well cleaned, there may be filter cake left in end B of the inlet channels 4. A second step is consequently performed where the inlet 3-way valve 24 is operated to connect the inlet gas duct 51 with the second inlet plenum 22b only; at the same time valve 25 is operated to connect only the first outlet plenum 23a to the outlet gas duct 57. Here the maximum axial velocity inside the honeycomb during cleaning is stronger on end B, thus removing all remaining cake of the filter, leaving it clean.

The schematics of both the filtering and the cleaning cycles for the embodiment of FIG. 6e are illustrated on FIGS. 2A to 2C. FIG. 2A shows the filtering cycle. The arrows in the filter illustrate the flow of particulate laden gas entering through duct 51, splitting into two currents and entering the inlet channels 4 through both ends A and B. From there it flows to the center of the channels while crossing the filtering boundaries 18 into the outlet channels 5, leaving behind a filter cake 15 on the wall 18 inside the inlet channels 4. The clean gases inside the outlet channels 5 leave through both ends and go to the outlet duct 57. The four flow control valves shown 24*a*, 24*b*, 25*a*, 25*b*, which may be embodied by the 3-way valves described above or by individual valves in the separate inlet and outlet plenums, remain open all the time and exert no action on filtration.

FIG. 2B shows step 1 of the two-steps cleaning of the filter according to this embodiment. The reverse flow of clean gas is seen entering the outlet duct 57 and being directed, by the appropriate use of the control valves 24*a*, 24*b*, 25*a*, 25*b*, to end A of the filter where it enters the outlet channels 5 and flows towards end B while at the same time crossing the filtering boundaries 18 into the inlet channels 4. It there detaches the filter cake 15 and carries it along towards end B, where it exits through inlet duct 51. The graph above the figure shows that the axial gas velocity in the inlet channels increases gradually from end A to end B, the maximal velocity around end A being higher than for one-step cleaning such as shown in FIG. 2D. Because of the low axial gas velocity at end A region, there may be some cake 15 still left in place, which requires the second cleaning step. FIG. 2C shows that second step where the reverse flow of clean gas enters the outlet duct 57 and, by the appropriate use of valves 24*a*, 24*b*, 25*a*, 25*b*, enters the outlet valves through end B of the filter and exits the inlet valves through end A. The graph above this drawing indicates that axial gas velocity at end A region is now highest and the cake 15 still left in place from the step 1 cleaning it is now efficiently removed. This completes the two-step cleaning cycle.

One skilled in the art will understand from the description above that as the particle laden gases enter the inlet channels through both ends during the filtration cycle, the average axial velocity of the gases inside the channels is half of what it would be on a conventional honeycomb where gases enter through a single end. This lower velocity reduces inertial phenomena which leads to solids segregation by particle size in the cake and uneven cake thickness.

Advantageously, as one moves on from the embodiments of FIG. 6A to 6E the increasing number of plenums and valves tends to improve the cleaning quality distribution along the filter. However, even in the simpler embodiments, there will be no dead-end particulate accumulation.

Each embodiment has its advantages and drawbacks, which should be weighted against the particular needs of a given system. For example, one-step cleanings do not require any flow control; thus, where a one-step cleaning is enough, flow control valves are not necessary. Conversely, in the two-step cleaning, restricting the reverse flow of cleaning gases to exit through one single inlet plenum provides an axial velocity through the filter channels twice as high compared to the one-step cleanings where the reverse-flow gases exit simultaneously through both inlet plenums. The higher axial velocity is desirable because it favors the cleaning action, the transport and removal of the cake from the filter. Furthermore, as noted, axial flow cleaning is milder and more selective than transversal across filter cleaning action, thus, preventing over-cleaning.

Of course, numerous modifications could be made to the embodiments described above without departing from the scope of the invention as defined in the appended claims.

The invention claimed is:

1. A dust collecting filter for the filtering of gas containing solid particles, comprising:
    a first and a second inlet plenum for receiving said gas containing solid particles;
    a plurality of collateral inlet channels each having opposite first and second input extremities respectively connected to the first and second inlet plenums to receive said gas therefrom;
    a plurality of outlet channels each having a shared filtering boundary with at least one of said inlet channels, said filtering boundaries allowing said gas to flow from said inlet channels to corresponding outlet channels while substantially retaining the solid particles from said gas in the inlet channels, each of said outlet channels having a first output extremity;
    a first outlet plenum connected to the first output extremity of all of said outlet channels for outputting said gas therefrom; and
    cleaning means for cleaning the solid particles out of said inlet channels, said cleaning means comprising a reverse flow apparatus for circulating pressurized gas backwards through said dust collecting filter, said cleaning means further comprising first and second inlet valve means for sequentially blocking gas circulation through said first and second inlet plenums during operation of the reverse flow apparatus.

2. The dust collecting filter according to claim 1, wherein each of said outlet channels comprises a second output extremity opposite the first output extremity, said dust collecting filter further comprising a second outlet plenum connected to said second output extremity of all of said output channels.

3. The dust collecting filter according to claim 1, comprising at least one filter plate including a wavelike-shaped filtering sheet forming alternating grooves on opposite sides thereof respectively defining the inlet and outlet channels, said wavelike-shaped filtering sheet defining the filtering boundaries therebetween.

4. The dust collecting filter according to claim 3, wherein each of said at least one filter plate comprises a flat sheet closing off the grooves along one side of said wavelike-shaped filtering sheet.

5. The dust collecting filter according to claim 4, wherein said wavelike-shaped filtering sheet and said flat sheet are made of a self-supporting filter medium.

6. The dust collecting filter according to claim 4, comprising a plurality of said filter plates stacked to form a honeycomb shape.

7. The dust collecting filter according to claim 6, wherein each of said filter plates comprises at least one inlet coalesced channel connecting the inlet channels of said filter plate to one of the first and second inlet plenums.

8. The dust collecting filter according to claim 6, wherein each of said filter plate comprises an outlet coalesced channel connecting the outlet channels of said filter plate to the first outlet plenum.

9. The dust collecting filter according to claim 1, wherein said reverse flow apparatus comprises:
    a high pressure nozzle oriented to project said pressurized gas into the dust collecting filter through said first outlet plenum; and
    a venturi positioned between said high pressure nozzle and said first outlet plenum for amplifying a flow of said pressurized gas.

10. The dust collecting filter according to claim 1, wherein said cleaning means comprise an inlet 3-way valve defining said first and second inlet valve means.

11. The dust collecting filter according to claim 2, wherein said cleaning means further comprise first and second outlet valve means for sequentially blocking gas circulation through said first and second outlet plenums during operation of the reverse flow apparatus inversely to the blocking of the first and second inlet plenums by the first and second inlet valve means.

12. The dust collecting filter according to claim 11, wherein said cleaning means comprise an outlet 3-way valve defining said first and second outlet valve means.

13. A dust collecting filter for the filtering of gas containing solid particles, comprising:
- a first and a second inlet plenum for receiving said gas containing solid particles;
- a plurality of collateral inlet channels each having opposite first and second input extremities respectively connected to the first and second inlet plenums to receive said gas therefrom;
- a plurality of outlet channels each having a shared filtering boundary with at least one of said inlet channels, said filtering boundaries allowing said gas to flow from said inlet channels to corresponding outlet channels while substantially retaining the solid particles from said gas in the inlet channels, each of said outlet channels having a first output extremity;
- a first outlet plenum connected to the first output extremity of all of said outlet channels for outputting, in operation, said gas therefrom, and for receiving, during a cleaning of the solid particles out of said inlet channels, pressurized gas for circulation backwards through said dust collecting filter; and
- first and second inlet valve means for sequentially blocking gas circulation through said first and second inlet plenums during said circulation of pressurized gas backwards through said dust collecting filter.

14. The dust collecting filter according to claim 13, comprising at least one filter plate including a wavelike-shaped filtering sheet forming alternating grooves on opposite sides thereof respectively defining the inlet and outlet channels, said wavelike-shaped filtering sheet defining the filtering boundaries therebetween.

15. The dust collecting filter according to claim 14, wherein each of said at least one filter plate comprises a flat sheet closing off the grooves along one side of said wavelike-shaped filtering sheet.

16. The dust collecting filter according to claim 15, wherein said wavelike-shaped filtering sheet and said flat sheet are made of a self-supporting filter medium.

17. The dust collecting filter according to claim 15, comprising a plurality of said filter plates stacked to form a honeycomb shape.

18. The dust collecting filter according to claim 17, wherein each of said filter plates comprises at least one inlet coalesced channel connecting the inlet channels of said filter plate to one of the first and second inlet plenums.

19. The dust collecting filter according to claim 17, wherein each of said filter plate comprises an outlet coalesced channel connecting the outlet channels of said filter plate to the first outlet plenum.

20. The dust collecting filter according to claim 13, comprising an inlet 3-way valve defining said first and second inlet valve means.

21. The dust collecting filter according to claim 13, wherein each of said outlet channels comprises a second output extremity opposite the first output extremity, said dust collecting filter further comprising a second outlet plenum connected to said second output extremity of all of said output channels, said dust collecting filter further comprising first and second outlet valve means for sequentially blocking gas circulation through said first and second outlet plenums during said circulation of pressurized gas backwards through said dust collecting filter inversely to the blocking of the first and second inlet plenums by the first and second inlet valve means.

22. The dust collecting filter according to claim 21, wherein comprising an outlet 3-way valve defining said first and second outlet valve means.

* * * * *